Sept. 4, 1923.
G. J. BOOCK
1,466,688
FOOT ACCELERATOR FOR TRACTORS
Filed March 20, 1922     2 Sheets-Sheet 1
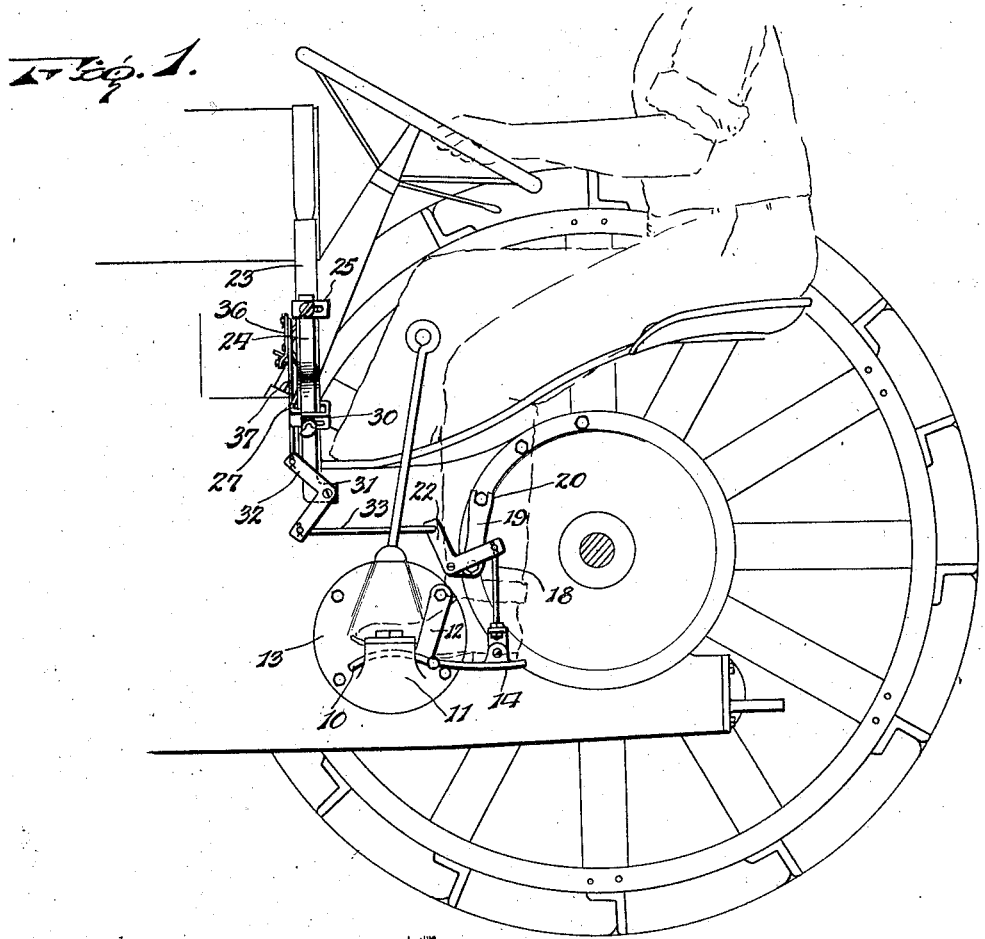
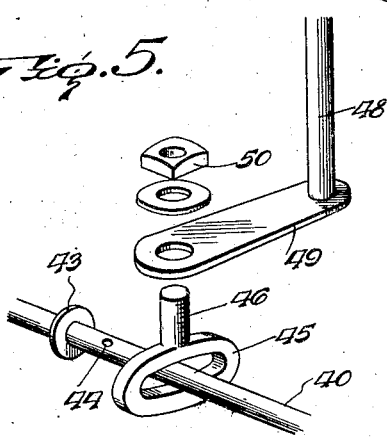
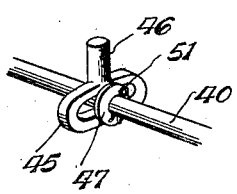
Inventor
G. J. Boock.
By Lacey & Lacey, Attorneys Sept. 4, 1923.
G. J. BOOCK
FOOT ACCELERATOR FOR TRACTORS
Filed March 20, 1922
1,466,688
2 Sheets-Sheet 2
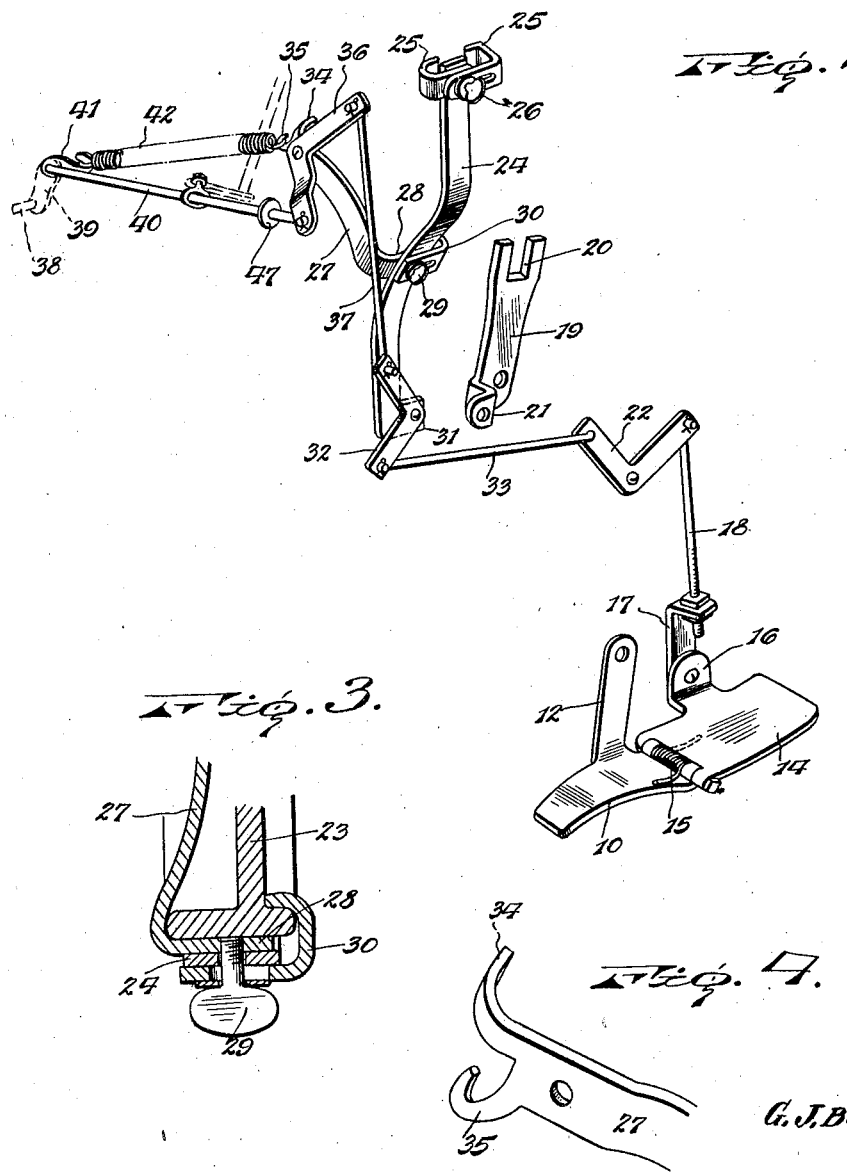
Inventor
G. J. Boock.
By Lacy & Lacy, Attorneys Patented Sept. 4, 1923.

1,466,688

UNITED STATES PATENT OFFICE.

GUSTAVE J. BOOCK, OF CONYNGHAM, PENNSYLVANIA, ASSIGNOR OF ONE-HALF TO EDWIN G. HINES, OF DRUMS, PENNSYLVANIA.

FOOT ACCELERATOR FOR TRACTORS.

Application filed March 20, 1922. Serial No. 545,234.

*To all whom it may concern:*

Be it known that I, GUSTAVE J. BOOCK, a citizen of the United States, residing at Conyngham, in the county of Luzerne and State of Pennsylvania, have invented certain new and useful Improvements in Foot Accelerators for Tractors, of which the following is a specification.

This invention relates to an improved foot accelerator for tractors, being particularly designed for use in connection with Fordson tractors, and seeks, as one of its principal objects, to provide a device whereby the throttle valve of a tractor engine may be efficiently controlled by the foot.

A further object of the invention is to provide a device which may be readily attached without the necessity for any structural change in the tractor or the boring of any holes or the like.

And the invention has a still further object to provide a device wherein, when desired, the foot control may be rendered inactive and the hand control connected with the mechanism for manually operating the throttle valve.

Other and incidental objects will appear hereinafter.

In the drawings:

Figure 1 is a fragmentary elevation showing my improved device in connection with a Fordson tractor, Figure 2 is a perspective view showing the device in detail, Figure 3 is a detail sectional view showing the manner in which the bracket arm of the device is attached to the body bar thereof, Figure 4 is a detail perspective view showing the free end of the bracket arm, Figure 5 is a detail perspective view showing the manner in which the hand control of the throttle lever is connected with the device, and Figure 6 is a detail perspective view showing the manner in which the hand control is employed when the foot control is rendered inactive.

In plowing with a Fordson tractor, difficulty is experienced in making turns, due to the fact that one hand must be employed to lift the plows out of the ground while the other hand must be employed for guiding the tractor. Accordingly, it is practically impossible to at the same time manipulate the hand control of the engine throttle to regulate the speed of the tractor. As will be appreciated, the tractor tends to lurch forwardly when the plows are lifted out of the ground and since the engine throttle cannot, for the reasons noted, be coincidentally closed, considerable danger of tipping the tractor over when turning is present, due to the accelerated speed of the tractor. The present invention, therefore, seeks to provide a device which will eliminate these conditions and wherein the throttle valve of the tractor engine may be controlled by the foot when turning, so that the speed of the tractor may be regulated, leaving one hand free for lifting the plows out of the ground and the other hand free for guiding the tractor.

In carrying the invention into effect, I employ a pedal bracket 10 which, as shown in Figure 1 of the drawings, is curved to fit over the transmission filler pipe 11 of the tractor and upstanding from said bracket is an arm 12 secured at its free end by one of the bolts holding the cover plate 13 of the tractor. Pivoted upon said bracket is a foot pedal 14 and interposed between the pedal and the bracket is a spring 15 normally holding the pedal elevated. At its inner side edge the pedal is provided with an ear 16 and connected to said ear is an angle plate 17 to which is adjustably attached an upstanding rod 18. Mounted upon the rear axle housing of the tractor at the adjacent side thereof is a bracket 19 provided near its lower end with an opening which, as shown in Figure 1, accommodates one of the bolts securing said housing while at its upper end said bracket is formed with a fork 20 accommodating another of said bolts. Projecting from the bracket at its lower end is an ear 21 and pivoted upon said ear is a bell crank 22. As will be observed, the rod 18 is pivotally connected to the rearwardly extending arm of this bell crank.

Mounted upon the dash 23 of the tractor, at the adjacent vertical edge thereof, is a body bar 24 bent longitudinally to conform to the contour of said edge so that the bar will lie thereagainst and mounted upon the bar at its upper end are companion clamping members 25. At their inner ends, these members overlie the bar in overlapping relation and extending through the members is a clamp screw 26 threaded into the bar, it being observed that one of the members is provided with a slot freely accommodating the screw so that said member may be readily adjusted toward or away from the other of said members. The clamping members are formed to embrace the dash 23 at its edjacent edge and, as will be perceived, may be readily positioned for rigidly attaching the bar at its upper end to the dash. Extending laterally from the bar at the forward side of the dash is a bracket arm 27 provided at its inner end with a laterally directed terminal 28 projecting beneath the bar and extending through the bar is, as shown in Figure 3, a clamp screw 29 threaded into said terminal rigidly connecting the arm with the bar. Overlying the bar is a clamping member 30 slotted to freely accommodate the screw. The clamping member 30, like the clamping members 25, is formed to embrace the dash 23 at its adjacent edge and, as will be appreciated, may be readily adjusted to firmly clamp the intermediate portion of the bar to the dash so that the bar will be rigidly held in place. Formed on the bar at its lower end is a laterally directed lug 31 and pivoted upon said lug is a bell crank 32. Connecting the downwardly extending arm of this bell crank with the forwardly extending arm of the bell crank 22 is a rod 33.

The arm 27 is arranged to incline upwardly with respect to the bar 24 and is formed at its upper end with a laterally curved terminal 34 spacing the free end of the arm from the dash 23. Formed on the arm beneath said terminal is, as shown in detail in Figure 4, a hook 35 and pivoted upon the arm immediately in the rear of said hook is a bell crank 36. Connecting the upwardly extending arm of this bell crank with the upwardly extending arm of the bell crank 32 is a rod 37. The usual throttle rod of the tractor is indicated at 38, this rod being provided at its rear end with an upstanding crank arm 39, and connecting said crank arm with the downwardly extending arm of the bell crank 36 is a rod 40. Mounted upon the forward terminal of said rod at the crank arm 39 is a hook 41 and detachably connected at one end to said hook is a spring 42, the opposite end of which is engaged with the hook 35 of the arm 27. The spring 42 will thus operate to normally hold the throttle valve of the tractor engine closed. Mounted on the intermediate portion of the rod 40 is, as best shown in Figure 5, a stop collar or shoulder 43 adjacent which the rod is provided with an opening 44 and formed to freely receive the rod therethrough is an eye 45 provided at its upper side with an upstanding stud 46. As best shown in Figure 6, the rod also carries a collar 47 free on the rod. The usual hand control rod for the engine throttle is indicated at 48, this rod being provided at its lower end, as best shown in Figure 5, with a crank arm 49 formed at its free end with an opening. The stud 46 of the eye 45 is adapted to fit through this opening and threaded upon the stud is a nut 50 connecting the eye with the arm.

As will now be readily understood in view of the preceding description, the foot pedal 14 may be depressed for shifting the rod 40 endwise and rocking the crank arm 39 upon the rod 38 to open the engine throttle when, upon release of the pedal, the spring 42 will act to return the throttle to closed position. The throttle may thus be efficiently actuated through the medium of the foot pedal for controlling the speed of the tractor. At the same time, the hand throttle lever may be moved in the customary manner for swinging the crank arm 49 to advance the eye 45 against the stop shoulder 43 upon the rod 40. As will be seen, this will result in shifting said rod endwise for opening the throttle valve while, when the hand lever is retarded, the spring 42 will act to again close the throttle. The throttle may thus be actuated either by the usual hand throttle lever or by the foot pedal, the rod 40 sliding through the eye 45 when the foot pedal is rocked to actuate the throttle. When the tractor is used for belt work, it often becomes desirable to render the foot control of the engine throttle inactive and substitute the hand control alone. To accomplish this result, the spring 42 is detached from the hook 41 when, as shown in Figure 6, the collar 47 is moved to a position along the rod 40 abutting the eye 45 and secured by a cotter pin 51 engaged through the opening 44 in the rod so that the eye will thus be confined between the collars 43 and 47. Accordingly, the hand control lever of the tractor may be manipulated for shifting the rod 40 endwise in opposite directions and positioning the engine throttle as desired.

Having thus described the invention, what is claimed as new is:

1. An accelerator including in combination with an oscillating throttle rod, a foot pedal, a body bar, an arm carried by and projecting from the bar, a contractile spring acting between said arm and rod for returning the rod when oscillated, and means carried by the body bar and said arm for connecting the pedal and said rod for oscillating the rod.

2. An accelerator including a body bar, an arm projecting from the bar, a bell crank pivoted upon said arm, an actuating rod connected to the bell crank, a bell crank pivoted upon the body bar, a connection between the bell cranks, a foot pedal, and an operative connection between the pedal and the bell crank on the body bar.

3. An accelerator including a body bar, an arm carried thereby, a bell crank pivoted upon said arm, an actuating rod connected with the bell crank, a spring acting between the rod and said arm, a foot pedal, and an operative connection between the rod and said bell crank.

4. An accelerator including a body bar, an arm carried thereby and provided at its free end with a hook, a bell crank pivoted upon the arm, an actuating rod connected to said bell crank, a hook carried by the rod, a spring connected at its ends to said hooks acting between the arm and rod, a foot pedal, and an operative connection between the pedal and said bell crank.

5. An accelerator including a body bar, an arm carried thereby, a bell crank pivoted upon said arm, an actuating rod connected to said bell crank and provided with a stop shoulder, an eye freely receiving the rod therethrough and adapted to form a connection between the rod and hand control mechanism for the rod operable to shift the eye in engagement with said shoulder for moving the rod longitudinally, a foot pedal, an operative connection between the pedal and said bell crank for shifting the rod independently of the eye, and means for locking the eye against the stop shoulder in relatively fixed position upon the rod.

6. An accelerator including in combination with a tractor dash and an oscillating throttle rod, a body bar overlying one edge of the dash, means carried by the bar securing said bar to the dash, an arm carried by the bar, a bell crank pivoted upon said arm, an operative connection between said bell crank and the throttle rod for oscillating the rod when the bell crank is rocked, a foot pedal, and an operative connection between the pedal and said bell crank.

7. An accelerator including a body bar, clamp members carried by the bar for securing the bar to a tractor dash, an arm carried by the bar, a bell crank pivoted upon said arm, an actuating rod connected with the bell crank, a foot pedal, and an operative connection between the pedal and said bell crank.

8. An accelerator including a body bar, coacting clamp members carried by the upper end of the bar, a clamp screw extending through said members connecting the members with the bar, one of the members being slotted to freely accommodate the screw, an arm, a clamp screw extending through the bar threaded into said arm connecting the arm with the bar, a clamp member slotted to receive the latter screw therethrough connected by said screw with the bar, the several clamping members being adapted to secure the bar to a tractor dash, a bell crank pivoted upon the arm, an actuating rod connected to said bell crank, a foot pedal, and an operative connection between said pedal and the bell crank.

In testimony whereof I affix my signature.

GUSTAVE J. BOOCK. [L. S.]